(12) United States Patent
Ozaki et al.

(10) Patent No.: US 9,731,830 B2
(45) Date of Patent: Aug. 15, 2017

(54) RECLINING MECHANISM FOR AIRCRAFT PASSENGER SEAT

(71) Applicant: JAMCO Corporation, Mitaka-shi, Tokyo (JP)

(72) Inventors: Masaji Ozaki, Mitaka (JP); Nozomu Tagami, Mitaka (JP); Sanae Ootake, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 15/122,491

(22) PCT Filed: Jul. 30, 2014

(86) PCT No.: PCT/JP2014/070055
§ 371 (c)(1),
(2) Date: Aug. 30, 2016

(87) PCT Pub. No.: WO2015/136727
PCT Pub. Date: Sep. 17, 2015

(65) Prior Publication Data
US 2017/0073076 A1 Mar. 16, 2017

(30) Foreign Application Priority Data
Mar. 14, 2014 (JP) .................................. 2014-050939

(51) Int. Cl.
*B64D 11/06* (2006.01)

(52) U.S. Cl.
CPC ........ *B64D 11/0642* (2014.12); *B64D 11/064* (2014.12)

(58) Field of Classification Search
CPC  B64D 11/0642; B64D 11/064 297/61, 354.13
See application file for complete search history.

(56) References Cited

U.S. PATENT DOCUMENTS

| 6,059,364 A * | 5/2000 | Dryburgh | A47C 1/0352 297/354.13 |
| 8,403,415 B2 * | 3/2013 | Lawson | B64D 11/06 297/354.13 |

(Continued)

FOREIGN PATENT DOCUMENTS

| JP | 63-305045 A | 12/1988 |
| JP | 6-343529 A | 12/1994 |

(Continued)

OTHER PUBLICATIONS

International Search Report dated Nov. 4, 2014, issued in counterpart International Application No. PCT/JP2014/070055, w/English translation (5 pages).

(Continued)

*Primary Examiner* — Anthony D Barfield
(74) *Attorney, Agent, or Firm* — Westerman, Hattori, Daniels & Adrian, LLP

(57) ABSTRACT

Provided is an improved reclining mechanism for an aircraft passenger seat. An aircraft passenger seat (100) is provided with a seat bottom frame (152) which constitutes a seat surface, and a seat back frame (162) which constitutes a back rest, wherein cam followers (240, 242) provided on both sides of the seat back frame (162) slide within cam grooves (132) on spreaders (130) supporting both sides of a seat mechanism. When an actuator (200) expands and pivots a link arm (230) in the direction of an arrow R1 to cause the seat back frame (162) to start reclining, a link plate (270) extends in the direction of an arrow F1, and pivots a head rest frame (172) in the θ direction. This operation prevents the line of sight of the passenger from being deviated from a video device provided on a back of a front seat.

4 Claims, 10 Drawing Sheets

U.S. PATENT DOCUMENTS

| | | | |
|---|---|---|---|
| 8,419,123 B2* | 4/2013 | Hankinson | B64D 11/06 297/354.13 |
| 2004/0036336 A1 | 2/2004 | Veneruso et al. | |
| 2004/0232283 A1 | 11/2004 | Ferry et al. | |
| 2008/0093502 A1 | 4/2008 | Bettell | |
| 2010/0201172 A1 | 8/2010 | Hudswell et al. | |
| 2010/0308167 A1 | 12/2010 | Hawkins et al. | |
| 2013/0175393 A1 | 7/2013 | Udriste et al. | |

FOREIGN PATENT DOCUMENTS

| | | |
|---|---|---|
| JP | 10-23941 A | 1/1998 |
| JP | 2008-510554 A | 4/2008 |
| JP | 2010-520117 A | 6/2010 |
| JP | 2011-84274 A | 4/2011 |
| JP | 2011-527653 A | 11/2011 |

OTHER PUBLICATIONS

Written Opinion dated Nov. 4, 2014, issued in counterpart International Application No. PCT/JP2014/070055, w/English translation (6 pages).

Decision to Grant a Patent dated Sep. 29, 2015, issued in counterpart Japanese Patent Application No. 2014-050939, w/English translation (6 pages).

Extended (Supplementary) European Search Report dated Dec. 16, 2016, issued in counterpart European Patent Application No. 14885491.2 (12 pages).

* cited by examiner

RECLINING MECHANISM FOR AIRCRAFT PASSENGER SEAT

TECHNICAL FIELD

The present invention relates to an improvement of a reclining mechanism for aircraft passenger seats.

BACKGROUND ART

FIG. 12 is an explanatory view of an outline of a passenger seat in a general aircraft.

A passenger seat 1 includes a seat bottom 2 which constitutes a seat surface and a seat back 3 which constitutes a back rest, and a passenger P is seated on the seat.

Passenger seats 1 are arranged at regular intervals along a direction of travel of the aircraft body, and the arrangement enables the passenger P to watch a video device provided on a back of a seat 1 in front of the passenger.

CITATION LIST

Patent Literature

[PTL 1] Japanese Unexamined Patent Application Publication No. H10-23941
[PTL 2] Japanese Translation of PCT International Application Publication No. 2008-510554

SUMMARY OF INVENTION

Technical Problem

An aircraft passenger seat is provided with a reclining mechanism.

When the passenger P sets the seat back 3 to a reclining position, problem occurs in which a line of sight S of the passenger P moves upward as the seat is reclined and the line of sight may be deviated from an image device 5 on a front seat, as illustrated in FIG. 12.

Therefore, the object of the present invention is to provide a reclining mechanism for aircraft passenger seat capable of solving the problem described above.

Solution to Problem

In order to achieve the above object, the reclining mechanism for an aircraft passenger seat according to the present invention includes, as basic means, a frame as a frame body fixed to a floor surface of an aircraft and supporting both side portions of a structural member of a seat, a seat back frame having link arms provided on both side portions of the seat back frame, the link arms having two cam followers attached to the link arm engaged with a cam groove formed on the frame, the seat back frame constituting a back rest, a head rest frame mounted pivotably on an upper end portion of the seat back frame, a link plate operating the head rest frame mounted on both sides of the seat back frame, a seat bottom frame constituting a seat surface, an eccentric cam supporting a lower surface of the seat bottom frame, a linear-motion-type actuator arranged on a lower side of the seat bottom frame, and a mechanism connecting a rod of the actuator and the link arm.

When the link arm pivots forward along with the expansion of the rod of the actuator, the seat back starts reclining, and link plates mounted on both sides of the seat back frame pivot an upper end of the head rest frame frontward.

Further, the eccentric cam is designed to pivot together with the reclining of the seat back and moves a front end of the seat bottom frame downward.

Advantageous Effects of Invention

The present invention comprises the above means, so that when the passenger reclines the seat back, the front end of the head rest pivots frontward according to the reclining angle. According to the present invention, the line of sight of the passenger will not be deviated from a screen of a video device provided on a back of the seat in front of the passenger, so that the passenger can enjoy the video image pleasantly.

DESCRIPTION OF EMBODIMENTS

Figure 1:
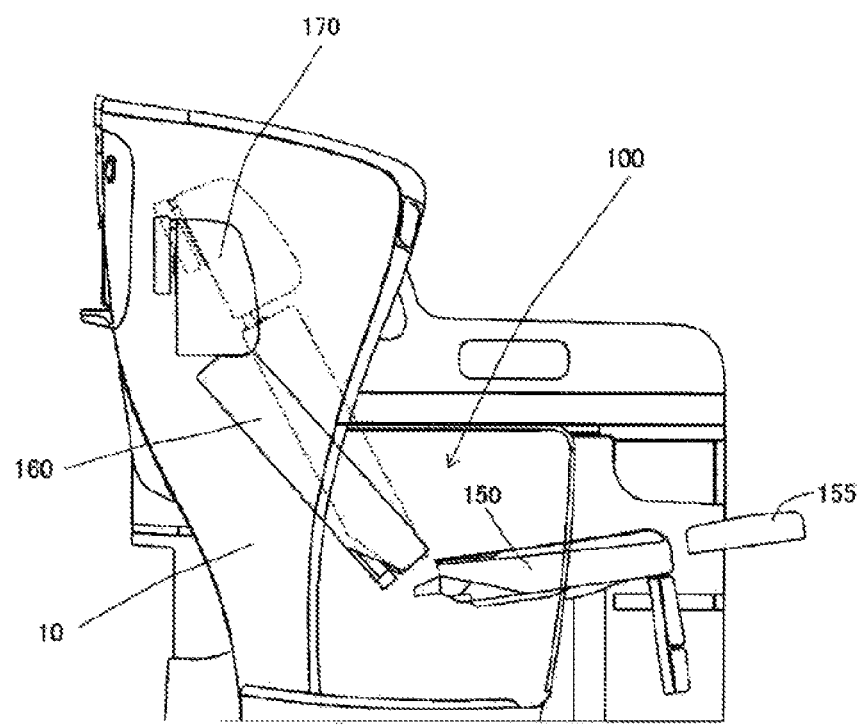
FIG. 1 is an explanatory view illustrating an outline of an aircraft passenger seat according to the present invention.

According to FIG. 1, an aircraft passenger seat according to the present invention denoted as a whole by reference number 100 includes a seat bottom 150 and a leg rest 155 attached to a front end of the seat bottom 150. The aircraft passenger seat 100 is attached to the aircraft body in a state where the seat is surrounded by a back shell 10.

Figure 2:
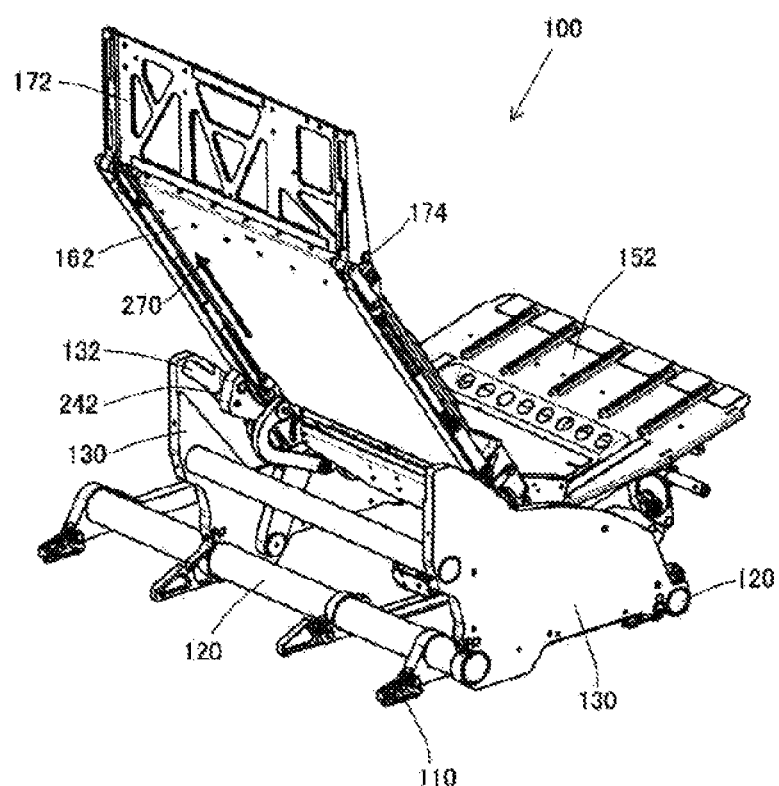
FIG. 2 is a perspective view of a general arrangement of the aircraft passenger seat according to the present invention.
Figure 3:
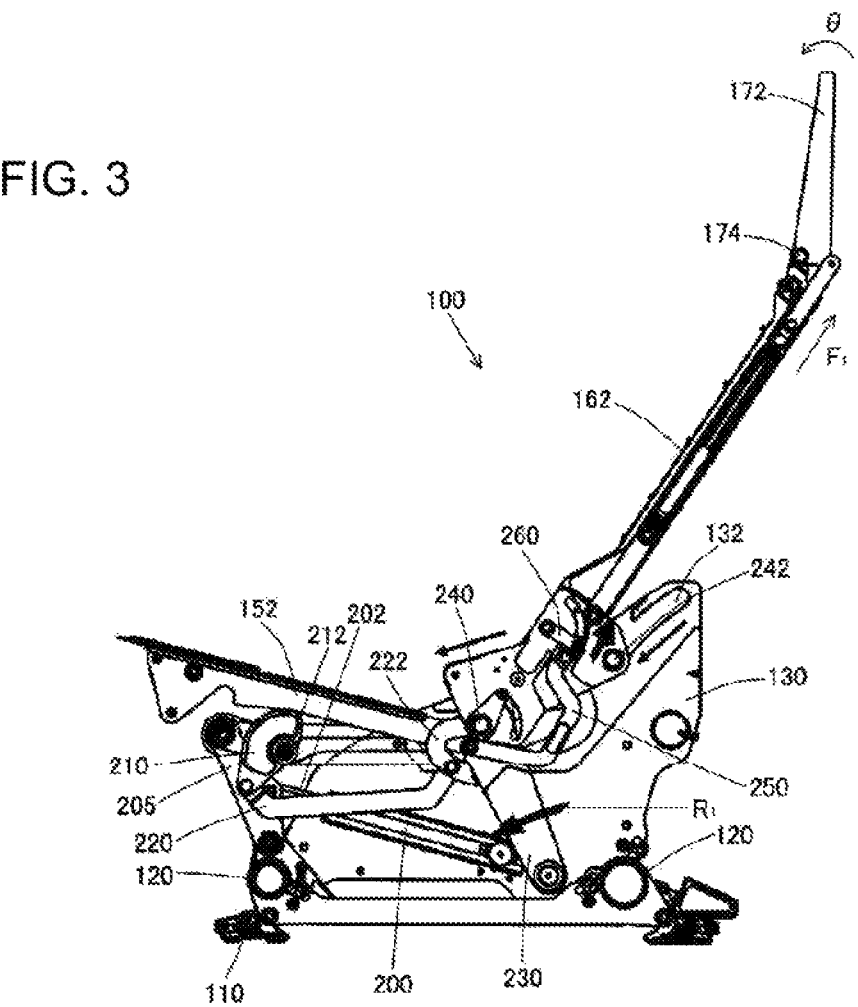
FIG. 3 is a side view of an outline of the aircraft passenger seat according to the present invention.

FIGS. 2 and 3 illustrate a skeleton structure of a whole body of the aircraft passenger seat 100 according to the present invention. The aircraft passenger seat 100 is fixed to a floor surface of the aircraft body via a mounting member 110. The mounting member 110 supports two pipes 120, and a structural member of the seat is mounted to the two pipes 120.

Frames 130 called spreaders are arranged on both sides of the structural member of the seat. Cam grooves 132 are formed on the inner sides of the frames 130, and cam followers 240 and 242 are engaged to the cam grooves 132.

The movement of the cam followers 240 and 242 is transmitted to a seat bottom frame 152 and a seat back frame 162, and a reclining operation is performed according to the movement. A head rest frame 172 is pivotably attached via a pin 174 to an upper end portion of the seat back frame 162. An eccentric cam 210 is attached to a lower surface on a front side of the seat bottom frame 152. The eccentric cam 210 is pivotably mounted to the seat frame, and supports the seat bottom frame 152.

Next, the reclining mechanism of the seat will be described.

An actuator 200 is arranged at a lower area of the seat bottom frame 152. The actuator 200 is a linear-motion-type actuator, and causes a rod 202 to be expanded and contracted. The rod 202 of the actuator 200 is connected to a link plate 205 disposed on a front portion of the seat, and the link plate 205 pivots in a counterclockwise direction in FIG. 2 by the expansion of the rod 202. The movement is transmitted via the link to a link arm 230 on a rear portion of the seat, and pivots the link arm 230 in a direction of arrow R1, i.e., counterclockwise direction. This movement causes the cam followers 240 and 242 to move downward within the cam grooves 132 of the spreaders 130.

Along with the lowering of the cam followers 240 and 242 within the cam grooves 132, the seat back frame 162 starts to recline rearward in accordance with the inclination of the cam groove 132. Meanwhile, the eccentric cam 210 supporting a lower portion of the seat bottom frame 152 pivots in a clockwise direction around a pin 212, and causes a leading end of the seat bottom frame 152 to descend downward. The link arm 220 transmits the movement to the rear direction. A link plate 250 drives a plate 260, and moves a link plate 270 in a direction of arrow F1.

This movement causes the head rest frame 172 to pivot in a direction of arrow θ around the pin 174.

Figure 4:
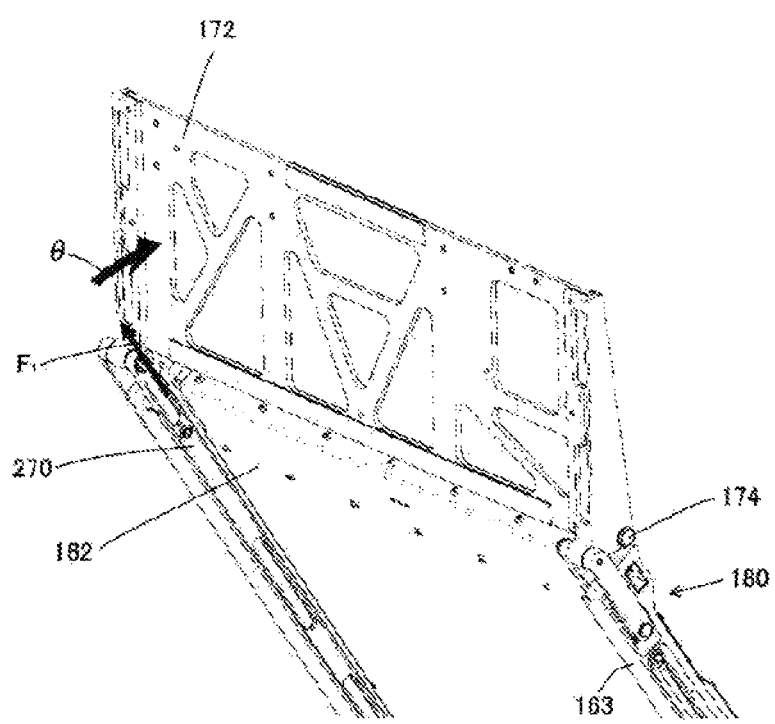
FIG. 4 is a perspective view of a relevant portion of the aircraft passenger seat according to the present invention.

FIG. 4 is a perspective view of the head rest frame 172 seen from a back side, showing a state where the link plate 270 moves in the direction of arrow F1 and the head rest frame 172 pivots in the direction of arrow θ.

Figure 5:
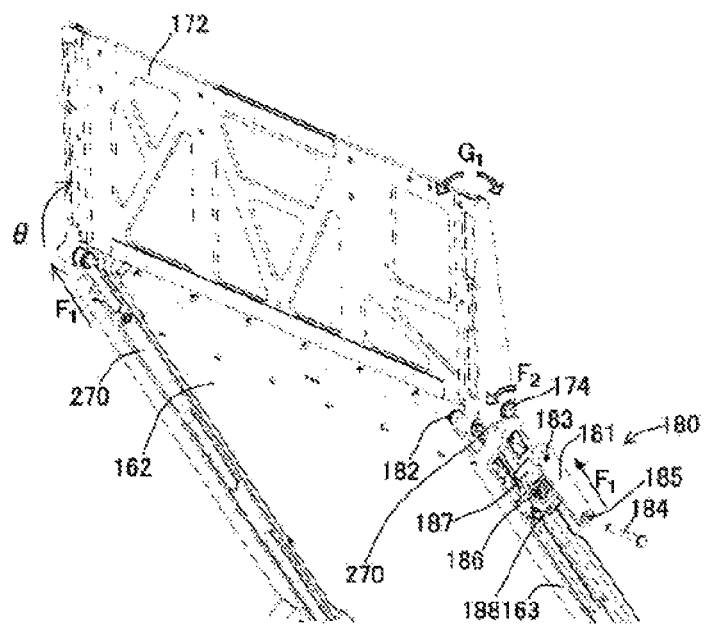
FIG. 5 is a perspective view of a relevant portion of the aircraft passenger seat according to the present invention.

FIG. 5 is a perspective view similar to FIG. 4, showing an arrangement of a device that prevents rattling that may occur when the head rest frame 172 is operated.

A rattle prevention device 180 disposed on an upper portion of a channel member 163 disposed on one side portion of the seat back frame 162 has a link plate 161 connected by a pin 182 to an upper portion of the link plate 270. A pin 184 inserted to a pin hole 185 formed on the other end portion of the link plate 181 is connected to an end portion member 188 of a coil spring 186 arranged within the channel member 163.

When the link plate 270 moves in a direction of arrow F1, the link plate 181 also moves simultaneously. An end portion member 187 on an upper portion of the coil spring 186 abuts against an end portion of the channel of the channel member 163, and the coil spring 186 is compressed. A repulsion F2 of the coil spring 186 acts in a direction preventing tilting movement of the head rest frame 172, and prevents generation of a rattling G1.

Figure 6:
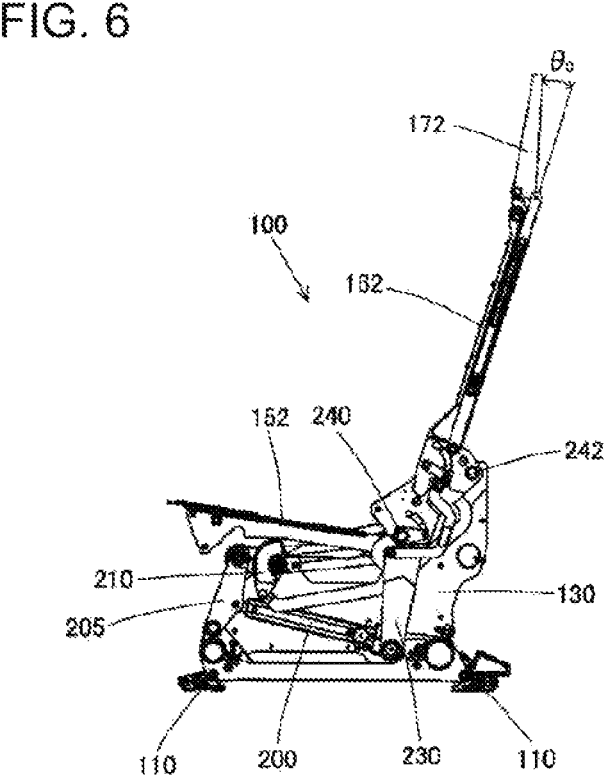
FIG. 6 is an explanatory view of an operation of the aircraft passenger seat according to the present invention.
Figure 7:
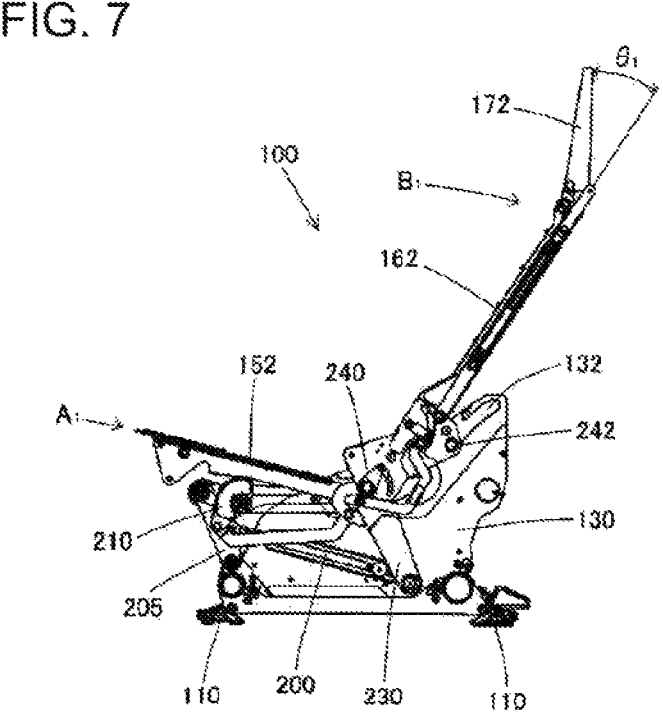
FIG. 7 is an explanatory view of an operation of the aircraft passenger seat according to the present invention.
Figure 8:
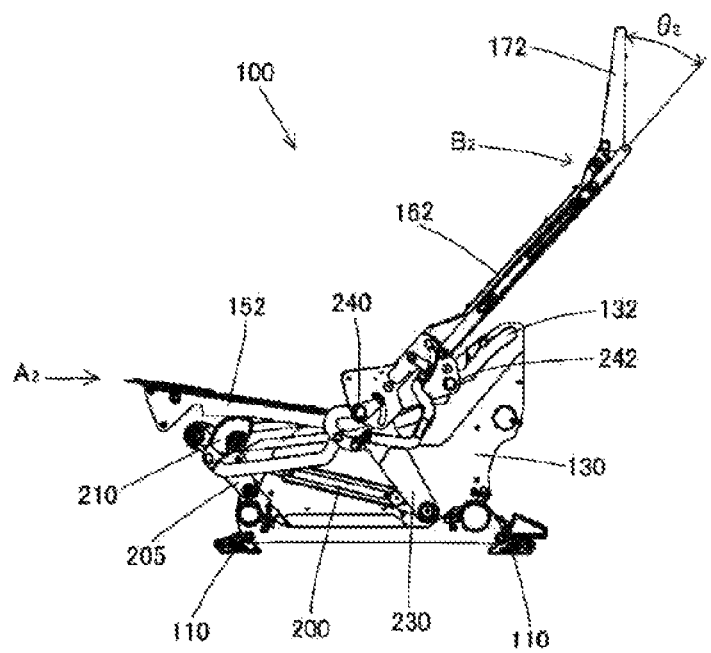
FIG. 8 is an explanatory view of an operation of the aircraft passenger seat according to the present invention.

FIGS. 6 through 8 are explanatory views of a reclining operation of the seat.

FIG. 6 shows an original position, i.e., upright position, where the reclining mechanism is not operated, which is taken during taxiing, take-off and landing referred to as TTL. An angle θ0 of the head rest frame 172 with respect to the seat back frame 162 corresponds to an initial state.

FIG. 7 illustrates a state where the reclining mechanism is operated to a shallow position B1, where a front end position of the seat bottom frame 150 is lowered to a somewhat lower position A1 than an original position by the operation of the eccentric cam 210. An angle θ1 of the head rest frame 172 with respect to the seat back frame 162 is increased than the initial state.

FIG. 8 illustrates a state where the reclining mechanism is operated to a deepest position B2, where the front end position of the seat bottom frame 152 is lowered to a lowest position A2 with respect to the original position by the operation of the eccentric cam 210. An angle θ2 of the head rest frame 172 with respect to the seat back frame 162 is increased to a maximum angle.

Figure 9:
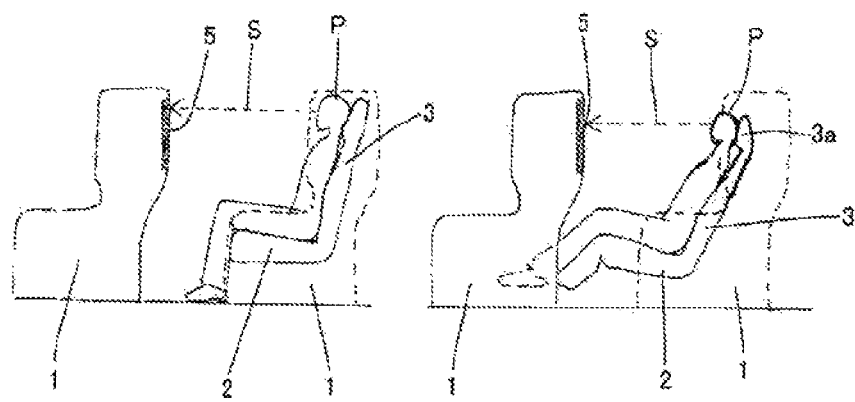
FIG. 9 is an explanatory view of an effect of the aircraft passenger seat according to the present invention.

As a result, as illustrated in FIG. 9, a head rest 3a supporting the back of the head of a passenger P tilts forward, and the line of sight S of the passenger P can be maintained on the image device 5 on the front seat.

Figure 10:
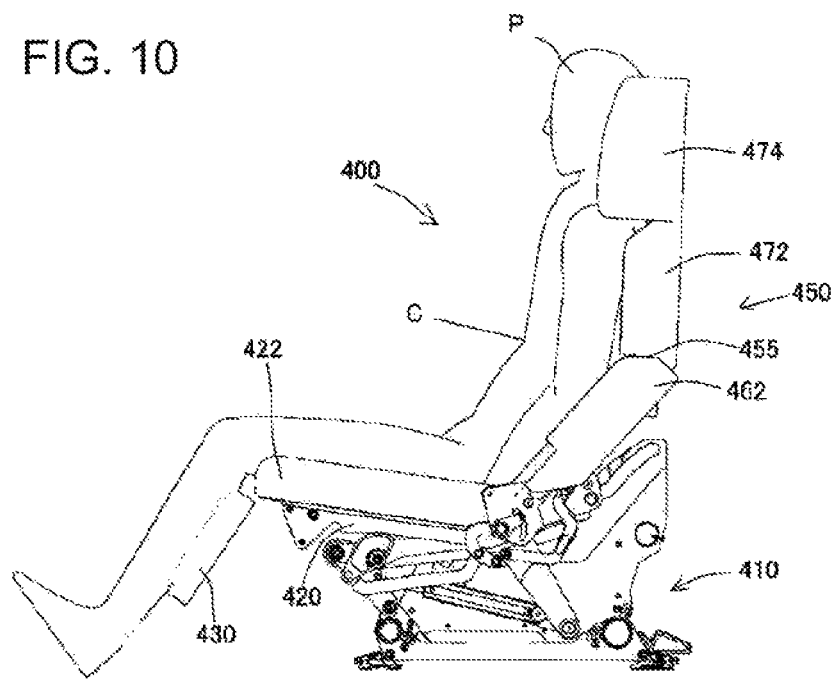
FIG. 10 is a side view of an outline of an aircraft passenger seat according to another embodiment of the present invention.

FIG. 10 is a side view of another embodiment of an aircraft passenger seat according to the present invention.

An aircraft passenger seat 400 includes a mounting structure 410 of the seat. The seat mounting structure 410 is similar to that described in the previous embodiment, so that the description thereof is omitted.

The seat 400 includes a seat back 450 that is divided into two parts. A seat bottom 422 and a leg rest 430 are the same as those described in the previous embodiment. The seat back 450 divided into two parts is composed of a lower seat back 462 and an upper seat back 472, and a bending portion 455 is arranged at a vicinity of a thoracic vertebrae C of the passenger P. According to the seat, a head rest 474 is formed integrally as the upper seat back 472.

Figure 11:
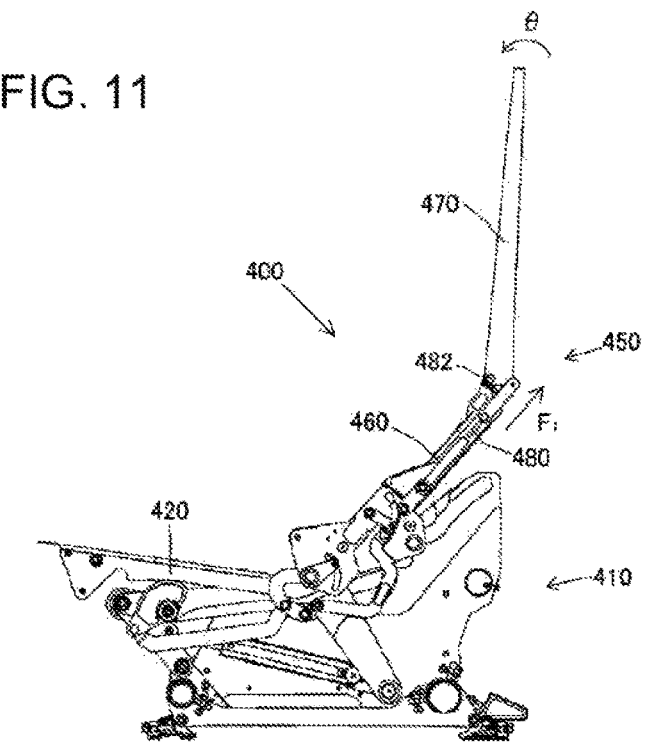
FIG. 11 is a side view of an outline of an aircraft passenger seat according to another embodiment of the present invention.
Figure 12:
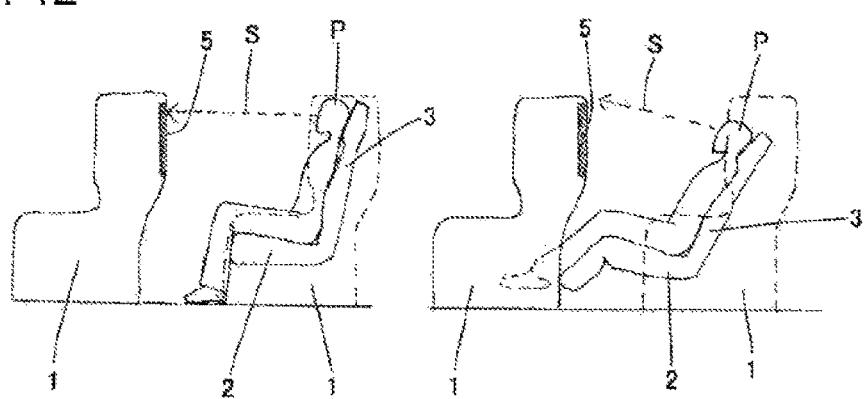
FIG. 12 is an explanatory view of an outline of an aircraft passenger seat according to the prior art.

FIG. 11 illustrates a configuration of the passenger seat 400.

The seat back 450 is divided into a lower seat back frame 460 and an upper seat back frame, and the frames are pivotably connected via a pin 482.

When the seat back 458 starts to be reclined and the lower seat back frame 460 tilts rearward while a link plate 480 extends in the direction of arrow F1, the upper seat back frame 470 pivots frontward in a direction of arrow θ around the pin 482.

As described, according to the aircraft passenger seat of the present invention, the angles of the head rest or the divided seat back vary when the seat back is reclined, so that the passenger can pleasantly enjoy the video image on the video device arranged on the back of the front seat, since the line of sight of the passenger will not change. Furthermore, since the passenger can take a resting position with a wide withstanding pressure distribution where not much burden is imposed on the muscles and back bone, the passenger can be seated taking a relaxed position even during long term use.

REFERENCE SIGNS LIST

100 Aircraft passenger seat
110 Mounting member
120 Pipe
130 Frame
132 Cam groove
150 Seat bottom
152 Seat bottom frame
160 Seat back
162 Seat back frame
170 Head rest
172 Head rest frame
200 Actuator
210 Eccentric cam
230 Link arm
240 Cam follower
242 Cam follower
270 Link plate
280 Rattling prevention device

The invention claimed is:

1. A reclining mechanism for an aircraft passenger seat comprising:
   a pair of spreaders as a frame body fixed to a floor surface of an aircraft and supporting both side portions of a structural member of a seat;
   a seat back frame comprising link arms provided on both side portions of the seat back frame, the link arms comprising two cam followers mounted on each link arm and engaged with a cam groove formed on each of the spreaders, the seat back frame constituting a back rest;
   a head rest frame mounted pivotably on an upper end portion of the seat back frame;
   a link plate operating the head rest frame mounted on both sides of the seat back frame;
   a seat bottom frame constituting a seat surface;
   an eccentric cam supporting a lower surface of the seat bottom frame;
   a linear-motion-type actuator arranged on a lower side of the seat bottom frame; and
   a mechanism connecting a rod of the actuator and the link arms,
   wherein in a case where the link arms pivot forward along with the expansion of the rod of the actuator, the seat back frame starts reclining, and the link plates mounted on both sides of the seat back frame pivot an upper end of the head rest frame frontward.

2. A reclining mechanism for an aircraft passenger seat comprising:
   a spreader as a frame body fixed to a floor surface of an aircraft and supporting both side portions of a structural member of a seat;
   a lower seat back frame comprising link arms provided on both side portions of the lower seat back frame, the link arms comprising two cam followers mounted on each link arm and engaged with a cam groove formed on the spreader;
   an upper seat back frame mounted pivotably on an upper end portion of the lower seat back frame;
   a link plate operating the upper seat back frame mounted on both sides of the lower seat back frame;
   a seat bottom frame constituting a seat surface;
   an eccentric cam supporting a lower surface of the seat bottom frame;
   a linear-motion-type actuator arranged on a lower side of the seat bottom frame; and
   a mechanism connecting a rod of the actuator and the link arm,
   wherein in a case where the link arm pivots forward along with the expansion of the rod of the actuator, the seat back frame starts reclining, and the link plates mounted on both sides of the lower seat back frame pivot an upper end of the upper seat back frame frontward.

3. The reclining mechanism for an aircraft passenger seat according to claim 1, wherein the eccentric cam pivots together with the reclining of the seat back and moves a front end of the seat bottom frame downward.

4. The reclining mechanism for an aircraft passenger seat according to claim 2, wherein the eccentric cam pivots together with the reclining of the seat back and moves a front end of the seat bottom frame downward.

* * * * *